United States Patent [19]

Rosenthal

[11] E Re. 29,026

[45] Reissued Nov. 2, 1976

[54] EMBRITTLEMENT MACHINING METHOD

[75] Inventor: Paul Rosenthal, Amherst, N.Y.

[73] Assignee: Cornell Aeronautical Laboratory, Inc., Buffalo, N.Y.

[22] Filed: June 20, 1975

[21] Appl. No.: 588,913

Related U.S. Patent Documents

Reissue of:

[64] Patent No.: 3,852,176
Issued: Dec. 3, 1974
Appl. No.: 336,115
Filed: Dec. 6, 1972

U.S. Applications:

[63] Continuation of Ser. No. 117,995, Feb. 23, 1971, abandoned.

[52] U.S. Cl. ..... 204/129.46; 204/129.8

[51] Int. Cl.[2] ..... C25F 3/00

[58] Field of Search ..... 204/129.35, 129.46, 204/140, 224, 129.8

[56] References Cited

UNITED STATES PATENTS

| | | | |
|---|---|---|---|
| 2,385,198 | 9/1945 | Engle | 204/224 |
| 3,424,054 | 1/1969 | Cook et al. | 204/222 |
| 3,565,775 | 2/1971 | Bouchet et al. | 204/224 |
| 3,672,963 | 6/1972 | DePalma | 204/14 N |

*Primary Examiner*—T. M. Tufariello
*Attorney, Agent, or Firm*—Allen J. Jaffe

[57] ABSTRACT

Embrittlement machining apparatus having an electrolytic container, an anode, a workpiece immersed in the electrolyte forming a cathode, a cutting head adjacent the workpiece and a conduit for supplying an embrittlement agent adjacent the workpiece and adjacent the cutting head.

2 Claims, 2 Drawing Figures

EMBRITTLEMENT MACHINING METHOD

Matter enclosed in heavy brackets [ ] appears in the original patent but forms no part of this reissue specification; matter printed in italics indicates the additions made by reissue.

*The invention herein described was made in the course of or under a contract with the U.S. Army Materials and Mechanics Research Center.*

This is a continuation of application Ser. No. 117,995, filed Feb. 23, 1971 and now abandoned.

BACKGROUND OF THE INVENTION

The present invention relates to an apparatus for machining metals which, heretofore, have been difficult or impossible to machine.

In a copending application Ser. No. 37,892 filed on May 15, 1970 and now U.S. Pat. No. 3,672,963 for "Process of Coating Metals With Mercury or Mercury Amalgams" and assigned to the assignee of the present invention, a process is disclosed for wetting metals with mercury or mercury amalgams whereby the surface layers of such metals are rendered brittle weak such that they can be machined more readily.

SUMMARY OF THE INVENTION

The present invention relates to the apparatus for machining metals which incorporates the embrittlement process of the aforementioned copending application.

Basically, the present invention provides; an electrolytic solution, a material to be machined immersed in said solution, cutting means adjacent said material to be machined and means for supplying an embrittling agent adjacent said material to be machined whereby upon the application of a voltage potential said material to be machined becomes the cathode and is wetted by said agent rendering the surface layers brittle and easy to machine.

According to the teachings of the aforementioned copending application, the embrittling agent may be mercury or mercury amalgam.

BRIEF DESCRIPTION OF THE DRAWINGS

For a fuller understanding of the invention reference should be had to the following detailed description of the same taken in conjunction with the accompanying drawings, wherein.

DESCRIPTION OF THE PREFERRED EMBODIMENT

Figure 1:
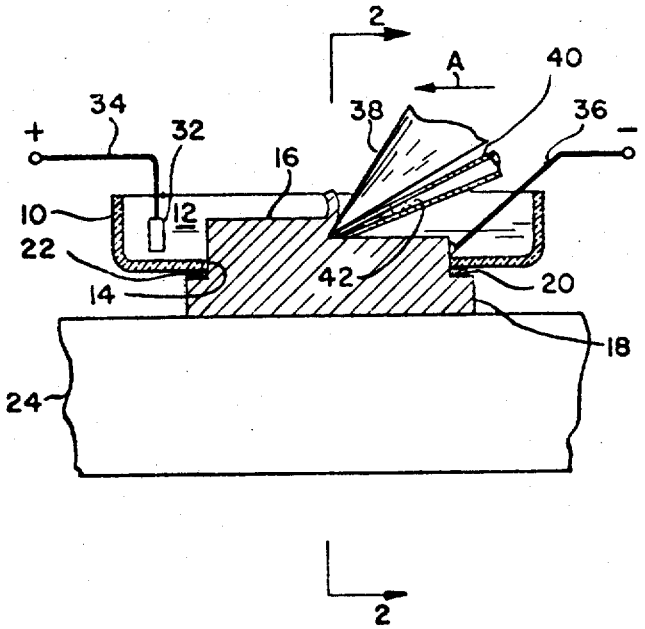
FIG. 1 is a longitudinal schematic sectional view of the apparatus of the present invention.
Figure 2:
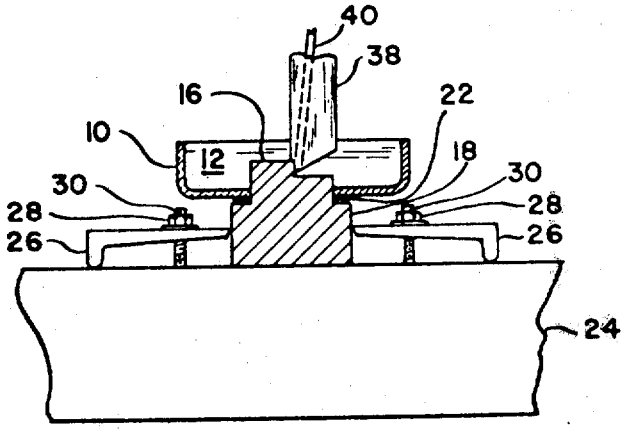
FIG. 2 is a sectional view taken along line 2—2 of FIG. 1.

Referring now to the drawings, FIGS. 1 and 2, a container 10 which may be glass, plastic or the like is adapted to hold on electrolytic solution 12 such as ethyl alcohol and perchloric acid. Suitable percentages would be 94 percent ethyl alcohol and 6 percent perchloric acid. The bottom of container 10 is slotted at 14 to receive therethrough the portion 16 of a workpiece 18 to be machined, which portion is immersed in the electrolyte 12. Workpiece 18 may have an annular ledge 20 or other suitable structure extending beyond the slot 14 for the support of suitable sealing means 22 between the ledge and the bottom outer surface of container 10 to prevent leakage of electrolyte therefrom. Workpice 18 is suitably clamped to a machine table 24 or the like by means of wedge shaped clamping blocks 26 and securing means in the form of nuts 28 and bolts 30, which extend from the machine table through the blocks.

A positive electrode or anode 32 such as graphite is located in the electrolyte and is connected by lead 34 to the positive side of a suitable source of potential. A lead 36 from the negative side of the potential source is in contact with the immersed portion 16 of the workpiece, rendering the same a negative electrode or cathode. Cutting means in the form of a cutting tool 38 of any suitable machine tool, such as a shaper, planer or miller is located adjacent portion 16 of the workpiece and suitably adjusted with respect thereto for the proper depth of cut, during movement in the direction of arrow A. Behind the clearance face of tool 38 and adjacent portion 16 of the workpiece is provided means 40 for delivering an embrittlement agent to the workpiece. Means 40 may comprise a tapered small diameter tube with an opening at the surface of workpiece 18 being machined. In fact this tube may be structurally similar to conduits for supplying cutting fluids to workpieces, as is well known.

A suitable embrittlement agent 42 such as mercury or mercury amalgams is supplied via means 40 to the workpiece. The agent may be dispensed by means of fluid pressure, in which case means 40 would be suitably linked to a fluid pressure source.

The operation of the apparatus of the present invention will now be discussed. Assuming, for example and not limitation, that the workpiece is of a traditionally hard to machine material such as stainless steel, then with the portion thereof to be machined immersed in the electrolyte and a suitable voltage potential applied across leads 34 and 36, the surface of the workpiece adjacent cutting head 38 and tube 40 becomes wetted with the agent 42 being supplied from tube 40. The surface layers of the portion of the workpiece to be machined becomes uniformly coated with the agent as described in greater detail in the aforementioned copending Ser. No. 37,892. Once wetted with the agent, the material to be machined becomes relatively brittle and weak and the resistance offered to cutting tool 38 is, accordingly, greatly reduced. The cutting force and, consequently, the power requirements are significantly reduced. This results in a more efficient machining operation.

It has been found that a voltage potential across leads 34 of 36 of from 10 to 45 volts has functioned satisfactorily.

Additionally, although not essential, it has been found that placing the workpiece under a tensile stress facilitates the embrittlement process. Therefore, suitable means may be provided to place the workpiece under tensile stress during the machining operation. Such means would be additional to the tensile stresses normally generated by the cutting head.

Although a preferred embodiment of the invention has been disclosed and described, changes will obviously occur to those skilled in the art. It is therefore intended that the invention is to be limited only by the scope of the appended claims.

I claim:

1. Embrittlement machining method comprising the steps of:

1. placing in a container an electrolytic solution the main constituent of which is alcohol,
2. immersing a workpiece having a portion to be machined in said solution adjacent a cutting head,
3. supplying an embrittling agent of mercury or mercury amalgam to said portion of the workpiece,
4. placing a first electrode in said solution forming an anode, and
5. applying a voltage potential across said anode and said workpiece.

2. The method according to claim 1, wherein:

6. said electrolytic solution comprises ethyl alcohol and perchloric acid.

* * * * *